R. MORRIS.
VEHICLE FENDER.
APPLICATION FILED MAR. 8, 1920.

1,363,529.

Patented Dec. 28, 1920.
2 SHEETS—SHEET 1.

Inventor
Ruben Morris
By Thurstonhaugh Co
Attys.

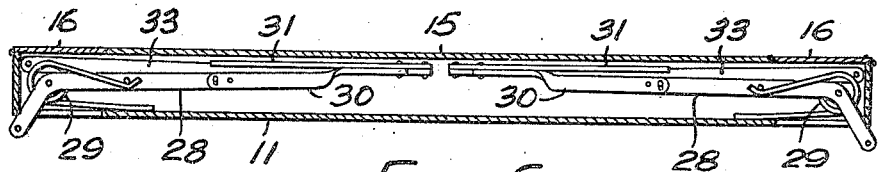
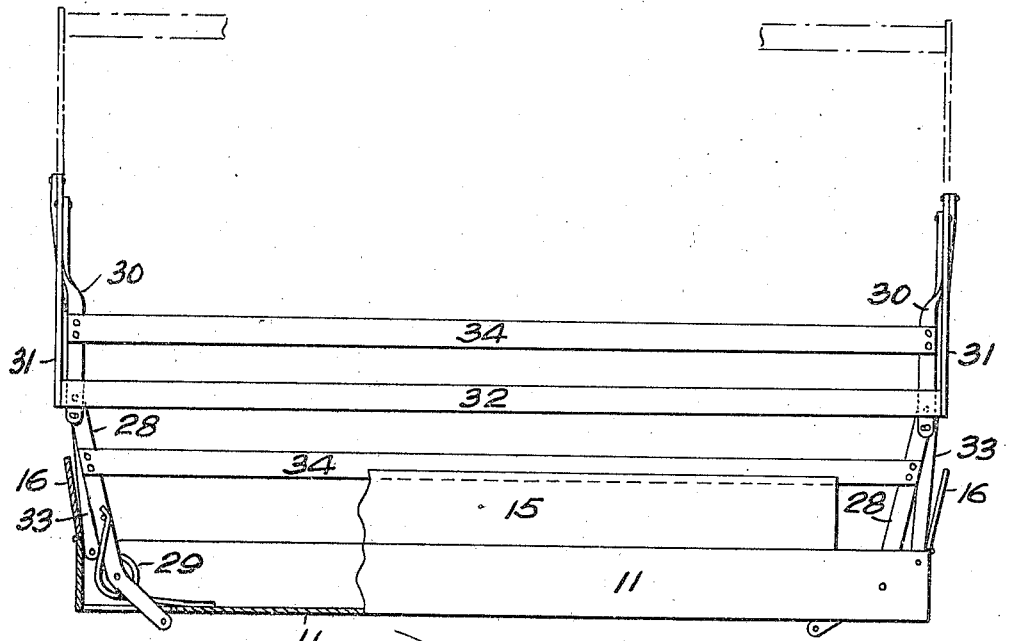
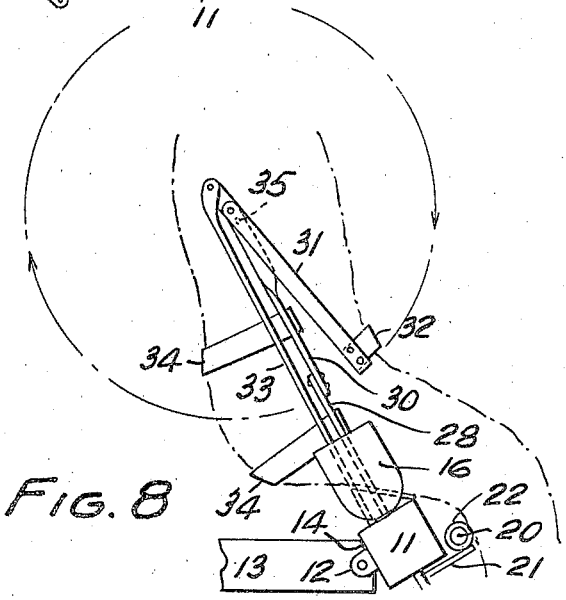

UNITED STATES PATENT OFFICE.

RUBEN MORRIS, OF MONTREAL, QUEBEC, CANADA.

VEHICLE-FENDER.

1,363,529. Specification of Letters Patent. Patented Dec. 28, 1920.

Application filed March 8, 1920. Serial No. 363,950.

*To all whom it may concern:*

Be it known that I, RUBEN MORRIS, a subject of the King of Great Britain, and resident of the city of Montreal, in the Province of Quebec and Dominion of Canada, have invented certain new and useful Improvements in Vehicle-Fenders, of which the following is a full, clear, and exact description.

This invention relates to improvements in bumpers and fenders, for vehicles such as automobiles, and the object of the invention is to provide a device which operates as a bumper in the case of collision with posts, other vehicles, etc., but which may operate as a fender to pick up human beings and prevent them from violent blows by the vehicle and from falling under the wheels thereof.

The device consists briefly of a casing extending transversely of the vehicle similarly to an ordinary bumper and containing in folded form a fender. A trigger bar is provided to open the casing and initiate movement of the fender when desired. This trigger bar normally lies close against the casing and is inoperative, but may at the will of the operator be released to assume position in advance of the casing and in operative relation with the fender.

In the drawings which illustrate the invention;

Fig. 6 is a vertical longitudinal section of the casing showing the fender folded therein, certain parts being omitted for clearness.

Fig. 7 is a front elevation partly in section of the fender in open position.

Fig. 8 is an end elevation of the fender in open position.

Figure 1:
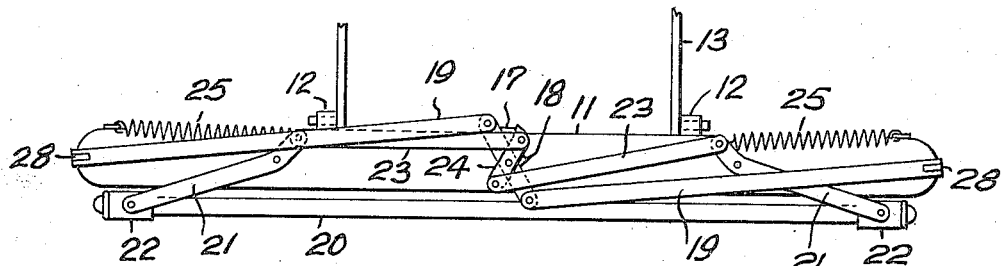
Figure 1 is a bottom plan view of the device in normal position.

Referring more particularly to the drawings, 11 designates a casing of any suitable dimensions and shape adapted to be disposed transversely of a vehicle in the position usually occupied by the front bumper thereof. This casing is provided with attaching sockets 12 having pivotal engagement with brackets 13 which may be attached to the sills of a chassis and which are formed as shown at 14 to permit limited pivotal movement of the casing. The casing is provided with a cover which may be in any suitable number of sections, for example, the central section 15 hingedly connected to the front edge of the casing and a pair of end sections 16 hingedly connected to the ends of the casing and adapted to open in an edgewise direction. The hinges supporting these cover sections are preferably of the spring type, so that upon release all sections of the cover will open instantly. The arrangement is preferably such that the end sections 16 of the cover are held in closed position by the central section, so that a single securing means attached to the central section holds all sections of the cover in closed position. A latch 17 pivotally connected to the rear of the casing engages and normally holds the cover closed. The tail of this latch projects below the casing and is engaged by the releasing mechanism as hereafter described.

Figure 2:
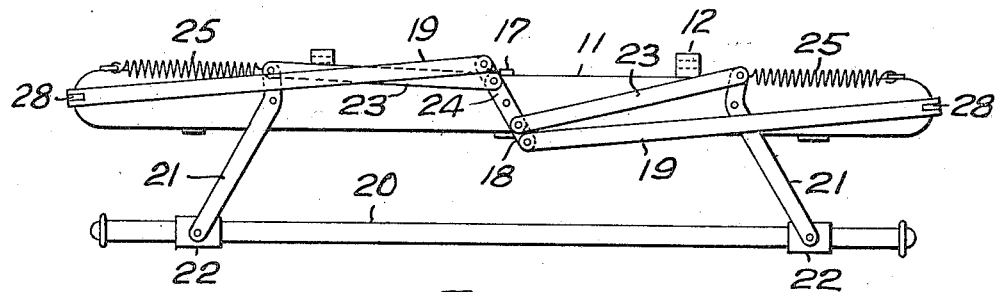
Fig. 2 is a view similar to Fig. 1 showing the trigger bar in its advanced position and in operative engagement with the fender.
Figure 3:
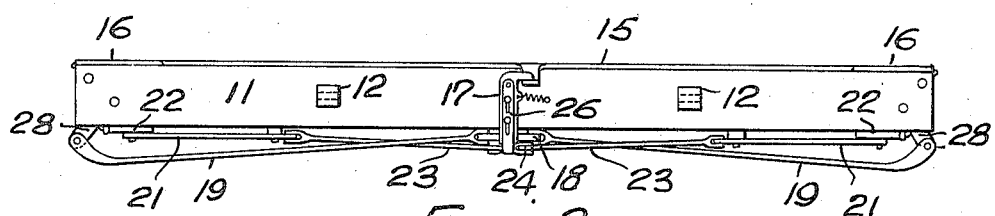
Fig. 3 is a rear elevation of the device.
Figure 5:
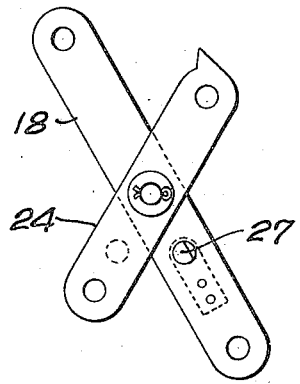
Fig. 5 is an enlarged bottom plan view illustrating the connection between the trigger bar and fender operating mechanism.
Figure 4:
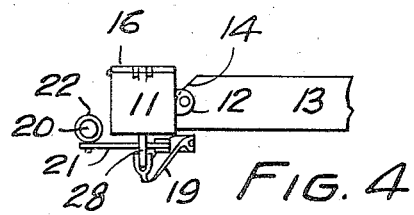
Fig. 4 is an end elevation.

A short lever 18 is pivotally mounted intermediate its ends to the bottom of the casing and is pivotally connected at its ends with links 19 which extend to and pivotally engage portions of the fender proper extending through the bottom of the casing. The tail of the latch 17 lies in the path of the lever 18 whereby movement of the lever operates the latch and releases the cover. A trigger bar 20 is provided in advance of the casing and is connected thereto by levers 21 pivotally connected intermediate their ends to the bottom of the casing and each pivotally connected at one end to a slide 22 on the trigger bar. The remaining ends of the levers 21 are pivotally connected to links 23 which are in turn pivotally connected to a short lever 24 pivotally mounted intermediate its ends on the bottom of the casing and oscillatable about the same center as the lever 18. This lever 24 is substantially in engagement with the lever 18 and normally lies at an angle thereto, as shown in Fig. 1. Springs 25 are connected in any suitable location, for example, between the ends of the links 23 and the casing and are operative to urge the lever 24 into alinement with the lever 18 and at the same time to rock the levers 21 and move the trigger bar 20 forwardly away from the casing to the position shown in Fig. 2. The lever 24 is normally held against movement by the springs 25 by any suitable means such as a latch 26, which may be slidably or otherwise mounted upon the latch 17 as shown in Fig. 3, so that the springs 25 are operative in the normal condition of the apparatus to hold the latch 17 in closed position, so that it cannot possibly be loosened by vibration. The lever 24, when shifted by its springs 25 into alinement with the lever 18, becomes releasably secured to the lever 18 by means of any suitable form of latch 27, which may be mounted upon either of the levers. The latch 26 which holds the trigger bar in its retracted position is operable from the driver's seat by any suitable means (not shown).

The fender comprises a pair of arms 28 each pivotally mounted adjacent one end toward an end of the casing, the long arms lying flat within the casing, as shown in Fig. 6. Powerful springs 29 are arranged in compression between the levers and the bottom of the casing and are operative to swing the levers upon release from a substantially horizontal position in the casing to a substantially vertical position at the ends of the casing, as shown in Fig. 7. The levers 28 may if desired be jointed intermediate their ends and the parts allowed limited relative movement whereby the end portions 30 may assume a vertical position beyond the ends of the casing, so that the open fender will span a greater width than the casing and the vehicle carrying it. The free extremities of the arms of these levers are each provided with a lever 31 pivotally mounted adjacent one of its extremities. The long arms of the levers 31 are connected across the device by one or more bands 32 of fabric, leather or the like, and the extremity of the shorter arm of each lever 31 is pivotally connected to one end of a link 33, the opposite end of which is pivotally connected within the casing at a point eccentric to the pivotal mounting of the adjacent lever 28. It will be noted that the levers 28 are movable in the plane of the casing, whereas the levers 31 are movable in planes transverse of the casing. The levers 28 are connected by any suitable number of bands or straps 34 of fabric or leather. Latches indicated at 35 may be provided to hold the levers 31 against reverse movement after the operation of the device. The links 19 are connected to the short arms of the levers 28.

The operation of the device is as follows:—

The fender is normally folded within the casing, as shown in Fig. 6, in which figure the straps 32 and 34 have been omitted. The trigger bar 20 normally occupies a position close against the front of the casing as shown in Fig. 1. If a vehicle carrying this device collides with another vehicle or strikes a post or like obstruction, the trigger bar is supported directly by the casing and the whole device acts in the same manner as the ordinary bumper. If the operator sees that there is danger of striking a pedestrian, he operates the means provided to retract the latch 26. The springs 25 then rock the levers 21 and 24 carrying the trigger bar to a position in advance of the casing and swinging the lever 24 in alinement with the lever 18 to which it becomes attached by the latch 27. The parts are now in the position shown in Fig. 2. If a person is now struck, the first part of the device to encounter him is the trigger bar 21 which, by reason of its spring mounting, acts as a cushion to minimize the shock and is also carried rearwardly toward the casing, so that it rocks the levers 24 and 18, which are latched together. The initial movement of the lever 18 releases the latch 17 from the cover 15 and all sections of the cover fly open. The movement of this lever 18 is also communicated through the links 19 to the short arms of the levers 28 and operates to assist the springs 29 in overcoming the inertia of the levers 28 and in swinging the levers up to the positions shown in Fig. 7. As the levers 28 rise, the differential mounting of these levers and the links 33 cause the levers 31 to swing in the manner shown in Fig. 8. The straps 34 of the fender provide a basket into which the person struck falls or is knocked by the force of the impact, while the strap 32 carried by the arms 31 passes over the person's head and down in front of the basket formed by the other straps to prevent a person being knocked forwardly by the impact or being thrown out of the basket. With the weight of a person in it, the casing and fender tip rearwardly as indicated in Fig. 8, the amount of this tipping being regulated by the formation of the bracket ends. This rearward tipping has the effect of letting a person's weight be carried well back of the casing, which becomes the foremost edge of the basket formed by the straps 34. Obviously, without this rearward tipping, the fender would be little if any use, as a person would simply drop in front of the device similarly to a fall in front of a tennis net. When the levers 31 swing forwardly, bringing the securing strap around to close the mouth of the basket, the levers become releasably locked by the latches 35, so that the device will not accidentally release a person. After operation, the parts may be easily and quickly returned to normal.

It will be seen that the device operates under ordinary circumstances as a bumper and in emergency as a fender, which not only absorbs the force of the impact when striking a person but also supports such person, so that he does not fall under the wheels of the vehicle. The device is mounted in the position of the ordinary bumper which is from eighteen to twenty-four inches above the ground, so that the blow when striking a person is at about the level of the knees. As the majority of persons are struck from behind or from the side, the natural result is that the person falls into the fender substantially as shown in Fig. 8. If a person should be struck while facing the vehicle, the operation will be the same but to a modified degree. The operation of the device is so rapid that the belt 32 will swing over a person's head before there is time for him to be knocked forward. The tendency of a person struck, especially in the region of the knee joint, is to collapse and this collapse is usually accompanied by a pivoting motion. This natural collapsing and pivoting accompanied by the restraining influence of the belt 32 will cause the person to fall into the fender. The comparatively low position of the device renders it equally operative with children and adults. If desired, the casing may be set somewhat lower than the ordinary bumper, thereby increasing its effectiveness in the case of very small children.

Having thus described my invention, what I claim is:—

1. In a device of the class described, the combination with a fender of a trigger bar arranged to release the fender for operation, and means for holding said trigger bar from operative relation with the fender and for releasing said trigger bar to assume operative relation with the fender.

2. In a device of the class described, the combination with a fender of actuating means therefor, a trigger mechanism normally disconnected from said actuating means and including springs urging it into connection with the actuating means, and a latch holding the trigger mechanism out of operative connection with the fender actuating means.

3. In a device of the class described, the combination with a fender, of actuating means therefor, a trigger mechanism normally disconnected from said actuating means including springs urging it into operative relation with the actuating means, a latch for automatically connecting the trigger mechanism and actuating means, and a second latch normally holding the trigger mechanism out of operative connection with the actuating means.

4. In a device of the class described, a casing, a fender normally folded therein, a cover for the casing maintaining the fender in folded form, fender actuating means carried by the casing, and a latch for the cover operable by said actuating means to release the cover and fender for operation.

5. In a device of the class described, a fender, means holding the fender normally in folded position, an actuating means, and connection between the actuating means and holding means adapted to release the fender for operation upon operation of the actuating means.

6. In combination with a device according to claim 5, a trigger mechanism controlling operation of the actuating means.

7. In combination with a device according to claim 5, a trigger mechanism normally disconnected from the operating mechanism including springs urging it into operative connection with the actuating means, and a latch normally holding the trigger mechanism against the urge of said springs.

8. In combination with a device according to claim 5, a trigger mechanism normally disconnected from the actuating means, springs urging said trigger mechanism into operative relation with the actuating means, a latch for releasably connecting the trigger mechanism and actuating means, and a latch normally holding the trigger mechanism out of operative connection with the actuating means.

9. In a device of the class described, a fender including a body member, a pair of spring actuated arms connected to opposite ends thereof and normally folded thereupon, a flexible band connected between said arms, means holding the arms in folded relation to the body, and means operable by impact to withdraw said holding means and release the arms for operation.

10. In combination with a device according to claim 9, means connected between the impact operable means and the fender arms for operating said arms.

11. In combination with a device according to claim 9, a trigger mechanism normally out of contact with the arm holding means, means urging said trigger mechanism into operative relation with the holding means, and a latch normally holding the trigger mechanism against operation by said urging means.

12. In combination with a device according to claim 9, a connection between the impact operable means and the means for operating said arms, a trigger mechanism normally disconnected from said impact operable means, springs arranged to move said trigger mechanism into operative position to receive and transmit impact to said impact operable means, and means normally holding the trigger mechanism from impact transmitting relation with the impact operable means.

13. In combination with a device according to claim 9, a differential lever mechanism connected between each arm and the body, a flexible member connected between said lever mechanisms, said lever mechanisms being operable by movement of the arms to shift said last mentioned flexible member from a position in rear of the flexible member between the arms to a position in front thereof.

14. A device according to claim 9, in which the fender body is a casing adapted to contain the down-folded arms and flexible member and the holding means includes a cover for said casing and a latch therefor.

15. In combination with a device according to claim 9, a pair of brackets hingedly supporting the fender body and permitting limited movement thereof.

In witness whereof I have hereunto set my hand.

RUBEN MORRIS.